United States Patent
Sanders et al.

(10) Patent No.: US 11,022,173 B2
(45) Date of Patent: Jun. 1, 2021

(54) MANUFACTURING DEVICE FOR MANUFACTURING A SOLID COMPONENT, AND METHOD FOR MANUFACTURING THE SOLID COMPONENT WITH THE MANUFACTURING DEVICE

(71) Applicant: SCHAEFFLER TECHNOLOGIES AG & CO. KG, Herzogenaurach (DE)

(72) Inventors: Bernhard Sanders, Rosstal (DE); Tobias Noeth, Geiselwind (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 110 days.

(21) Appl. No.: 15/776,935

(22) PCT Filed: Oct. 27, 2016

(86) PCT No.: PCT/DE2016/200494
§ 371 (c)(1),
(2) Date: May 17, 2018

(87) PCT Pub. No.: WO2017/088866
PCT Pub. Date: Jun. 1, 2017

(65) Prior Publication Data
US 2018/0347629 A1    Dec. 6, 2018

(30) Foreign Application Priority Data
Nov. 24, 2015 (DE) .................... 102015223182.8

(51) Int. Cl.
| B23B 5/36 | (2006.01) |
|---|---|
| F16C 33/46 | (2006.01) |
| F16C 33/38 | (2006.01) |
| F16C 33/49 | (2006.01) |
| F16C 19/26 | (2006.01) |
| F16C 19/36 | (2006.01) |

(52) U.S. Cl.
CPC ............ F16C 33/4629 (2013.01); B23B 5/36 (2013.01); F16C 33/3843 (2013.01);
(Continued)

(58) Field of Classification Search
CPC .............. F16C 33/4269; F16C 33/4623; F16C 33/497; F16C 33/3843; F16C 33/4676;
(Continued)

(56) References Cited

U.S. PATENT DOCUMENTS

| 2005/0201840 A1* | 9/2005 | Kodaka | .................. B23B 27/06 |
|---|---|---|---|
| | | | 409/304 |
| 2007/0041801 A1* | 2/2007 | Randecker | .......... B23B 51/0486 |
| | | | 408/229 |

(Continued)

FOREIGN PATENT DOCUMENTS

| DE | 911689 C | 5/1954 | |
|---|---|---|---|
| DE | 4212238 A1 * | 10/1993 | ............. B23Q 27/00 |

(Continued)

OTHER PUBLICATIONS

Stenzel; DE 42 12 238 Machine Translation, 1993 (Year: 1993).*
(Continued)

*Primary Examiner* — Lee A Holly
(74) *Attorney, Agent, or Firm* — Brooks Kushman P.C.

(57) ABSTRACT

A method of manufacturing, comprising utilizing at least one cycloid machine to machine a component blank, wherein the component blank includes a plurality of pockets, guiding a tool cutting lip of a chisel along a cycloid path relative to the component blank rotating about a component rotation axis in a component direction of rotation, rotating the chisel about a tool rotating axis, wherein the tool rotating axis is arranged offset to the component rotating axis, machining the plurality of pockets, wherein a radial vector to a tool rotation axis that extends through a cutting edge of the tool cutting lip, and dividing the tool cutting lip into a clearance angle portion and into a rake angle portion, wherein the clearance angle portion is configured to be at least twice as large as the rake angle portion of the chisel.

16 Claims, 8 Drawing Sheets

(52) U.S. Cl.
CPC ...... *F16C 33/4623* (2013.01); *F16C 33/4676* (2013.01); *F16C 33/497* (2013.01); *F16C 19/26* (2013.01); *F16C 19/364* (2013.01); *F16C 2220/62* (2013.01)

(58) Field of Classification Search
CPC .... F16C 19/26; F16C 19/364; F16C 2220/62; F16C 33/4629; B23B 5/36
See application file for complete search history.

(56) References Cited

U.S. PATENT DOCUMENTS

2007/0048100 A1* 3/2007 Boyd ................ B23B 51/02
                                                    408/26
2014/0193112 A1   7/2014 Caspall

FOREIGN PATENT DOCUMENTS

| | | |
|---|---|---|
| DE | 4212238 A1 | 10/1993 |
| DE | 4034516 C2 | 12/2003 |
| DE | 102014014669 A1 | 4/2016 |
| FR | 1345014 A | 12/1963 |
| JP | 2002011630 A | 1/2002 |
| JP | 2009285736 A | 12/2009 |
| JP | 2012223832 A | 11/2012 |
| JP | 2013096542 A | 5/2013 |

OTHER PUBLICATIONS

International Search Report and Written Opinion for Application No. PCT/DE20161200494, dated Jan. 26, 2017, 6 Pages.
Chinese Office Action for Application No. 201680069685.2, dated Feb. 1, 2019, 7 pages.

* cited by examiner

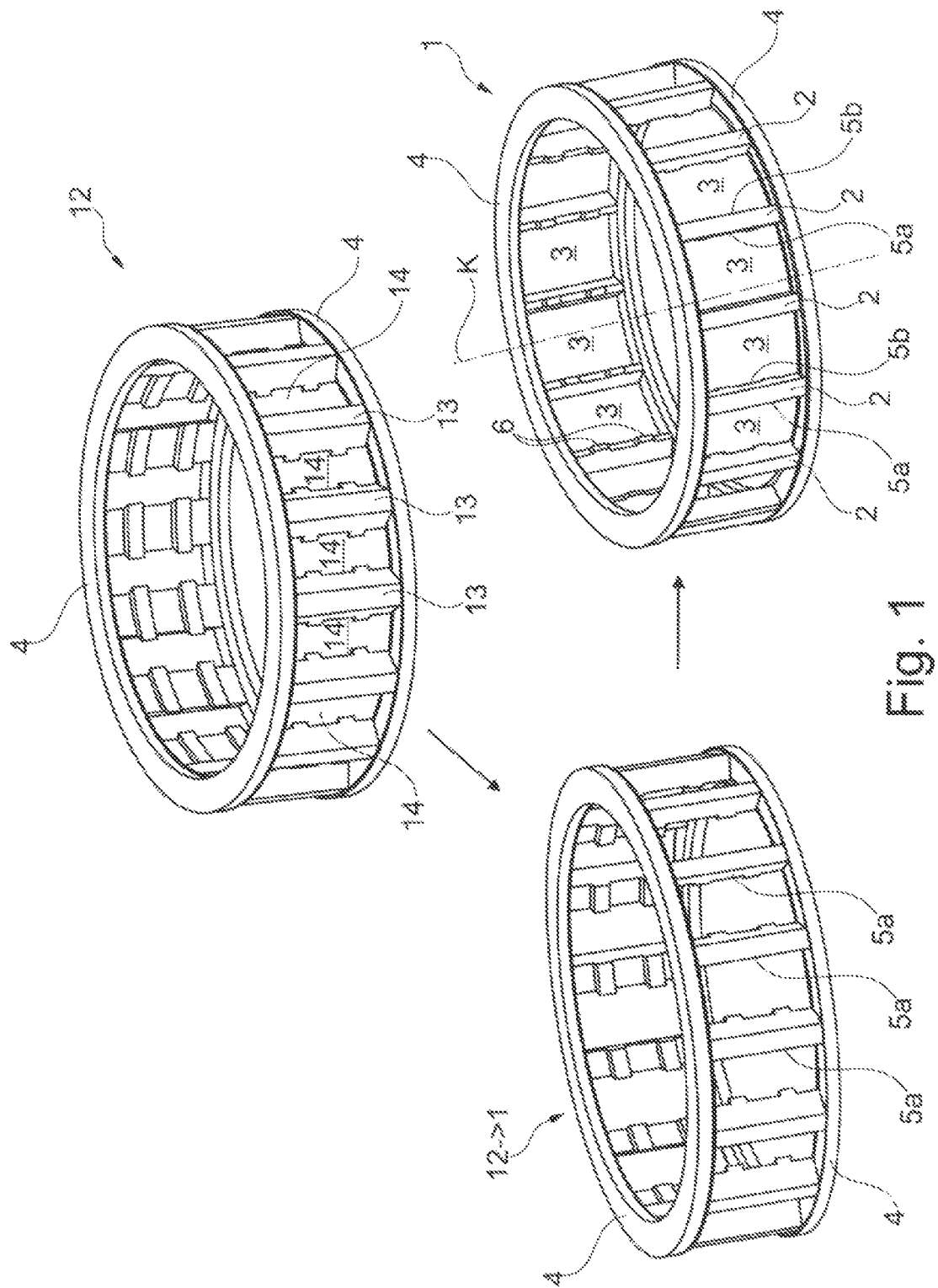

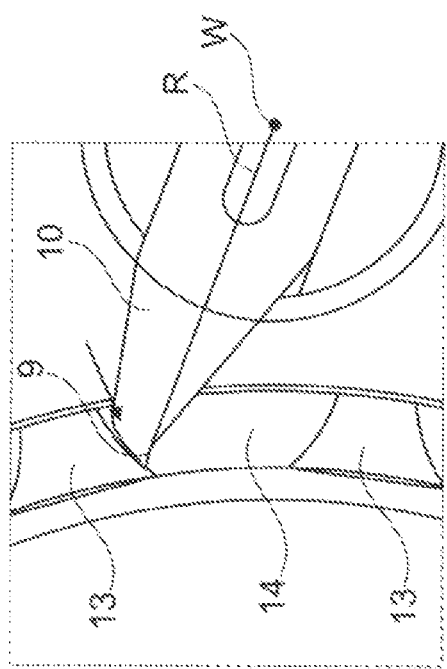
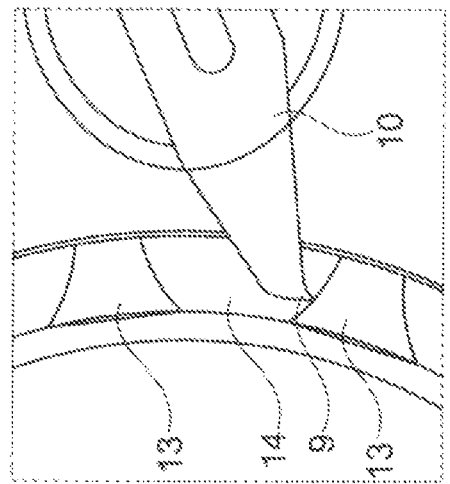
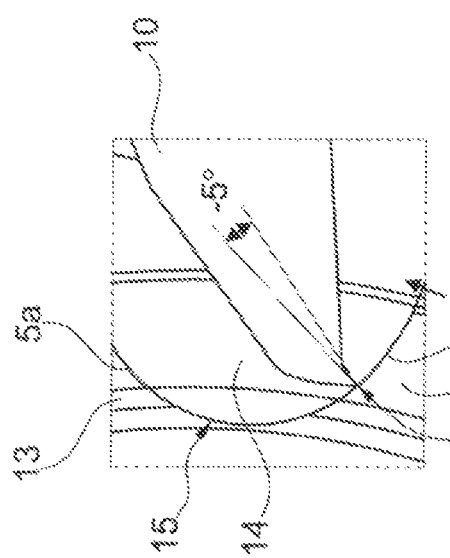

MANUFACTURING DEVICE FOR MANUFACTURING A SOLID COMPONENT, AND METHOD FOR MANUFACTURING THE SOLID COMPONENT WITH THE MANUFACTURING DEVICE

CROSS-REFERENCE TO RELATED APPLICATIONS

This application is the U.S. National Phase of PCT/DE2016/200494 filed Oct. 27, 2016, which claims priority to DE 102015223182.8 filed Nov. 24, 2015, the entire disclosures of which are incorporated by reference herein.

TECHNICAL FIELD

The disclosure concerns a manufacturing device for manufacturing a solid component from a component blank having the features described below. The disclosure further concerns a method for manufacturing the solid component with the manufacturing device.

BACKGROUND

Solid components are often used as components in machines, plant equipment etc. that is to say components which are made by cutting methods out of a solid semi-finished product. One example of such a solid component is a solid cage for use in a rolling element bearing. The solid cage has the function of guiding the rolling elements and spacing them apart from one another. Solid cages of this type have an annular configuration and comprise windows in which the rolling elements are arranged.

The publication DE 40 34 516 C2 discloses a method and a suitable device, wherein a workpiece and a cutting lip of a tool are moved relative to each other such that the cutting lip is guided along an approximately bloom-shaped path relative to the workpiece, as result of which windows are made in the workpiece in order to form a cage. In another machining variant the cutting lip is guided radially outside of the workpiece which results in a type of "scooping" of the material out of the workpiece.

SUMMARY

It is an object of the disclosure to propose a manufacturing device for manufacturing a solid component that may make possible a high level of precision of manufacturing. This object is achieved with a manufacturing device having the features and method as described below.

The subject matter of the disclosure is a manufacturing device that makes it possible to manufacture a solid component out of a component blank in form of an intermediate product. In further embodiments of the disclosure the manufacturing device enables the manufacturing of solid component out of a semi-finished product, wherein the component blank in form of an intermediate product is likewise made by the manufacturing device. The solid component and/or the semi-finished product and/or the component blank may be made of a metal. In principle, the metal can be a steel material, but it is also possible to make the solid component, the semi-finished or intermediate product out of a nonferrous metal in particular out of a copper alloy.

The solid component defines a component rotating axis, in which the component rotating axis is determined by the axis of rotation of the solid component during operation. The solid component comprises a plurality of pockets that may be spaced apart at regular intervals in peripheral direction about the component rotating axis. Arranged between the pockets may be intermediate regions particularly webs. Each pocket comprises in peripheral direction a first and a second pocket side that are formed by the adjoining intermediate regions particularly sides of the webs. The pockets are configured as blind pockets or as through-holes in the solid component. In particular, edges of each pocket are defined by two intermediate regions, particularly webs.

The component blank comprises a plurality of rough pockets which may be separated or spaced apart from one another through rough intermediate regions, particularly rough webs. The partial or complete manufacturing of the component blank out of the semi-finished product can be performed optionally in one preliminary step or preliminary cycloid machining step likewise on the manufacturing device.

The component blank is particularly configured in form of a ring or cylinder or comprises at least one ring section or cylinder section. The rough pockets form openings and/or through-holes in radial direction in the ring or ring section. Alternatively, the rough pockets are configured as rough blind pockets in the cylinder section. The rough intermediate regions, particularly rough webs, are disposed in those regions in which, after further manufacturing steps, the intermediate regions, particularly webs are arranged. In particular, the number of rough intermediate regions, particularly rough webs corresponds to the later number of intermediate regions particularly webs.

The manufacturing device comprises a component rotating device for rotating the solid component about the axis of rotation of the component. The component rotating device is configured in particular as a fulcrum along an axis of rotation and the solid component is mounted on the axis of rotation.

The manufacturing device comprises a chisel and the chisel comprises a tool cutting lip. By the term chisel is to be understood particularly a tool which has a geometrically defined cutting lip which serves as a tool to cut off material from the semi-finished product or the component blank.

The manufacturing device further comprises a tool rotating device to rotate the chisel about a tool rotating axis. The tool rotating axis is particularly configured as a further rotating axis. The tool rotating axis is arranged offset to the component rotating axis. The tool rotating axis and the component rotating axis may be oriented parallel to each other. The distance between the component rotating axis and the tool rotating axis is called feeding distance.

The manufacturing device also comprises a feeding device for varying the feeding distance. In particular, the manufacturing device also possesses an ability to vary the axial position of the tool cutting lip and/or the component blank, the semi-finished product or the solid component. Thus function can be realized in the component rotating device, the tool rotating device, the feeding device or in a further device.

The manufacturing device further comprises a control device such as, for example, a digital data processing device, a CNS-control, or the like, that is configured to control the component rotating device, the tool rotating device and the feeding device. In particular, the control device can drive the manufacturing device in such a way that the tool cutting lip of the chisel is guided relative to the component blank, which is rotating about the component rotating axis in a component rotating direction, along a cycloid path for machining the rough pockets.

The control device is configured to implement the controls in such a way that, in a first step, the first pocket sides are made in the component blank with the tool cutting lip particularly by cutting, and/or by machining and/or by chip removal. The configuration is realized with a final contour so that the pocket sides formed can be used as destined without further finishing steps. In a first cycloid machining step the tool cutting lip is guided relative to the component blank along a first cycloid path. The tool cutting lip is guided relative to the component blank along the first cycloid path while the component blank is rotating in a first component rotating direction about the component rotating axis According to the disclosure, the first pocket sides are cut with the tool cutting lip. A rake angle of the tool cutting lip during the manufacturing of the first pocket sides may be defined at −15° to 0°, or is even a positive angle. In particular, in the first cycloid machining step, the first pocket sides are not made by "scraping". One embodiment may guide the tool cutting lip without contact to the second pocket sides or the regions of the rough pockets which subsequently are to form the second pocket sides.

The control device is configured to reverse the component rotating direction and the tool rotating direction after the first cycloid machining step, so that the component blank is rotated in an opposite component direction and the tool is rotated in an opposite tool direction.

The control device may be configured to implement the controls in such a way that, in a further step, a further tool cutting lip is guided in a second cycloid machining step relative to the component blank along a second cycloid path. The further tool cutting lip is guided in the second cycloid machining step relative to the component blank, which is rotating about the component rotating axis in the opposite component rotating direction, along the second cycloid path for machining the rough pockets. According to the disclosure, the second pocket sides are cut with the further tool cutting lip. A rake angle of the further tool cutting lip during the manufacturing of the second pocket sides may be defined in a range between −15° and 0°, or is even a positive angle. In particular, in the second cycloid machining step the second pocket sides are not made by "scraping". One embodiment may guide the tool cutting lip without contact to the first pocket sides.

The rake angle may be defined by the angle between the material plane prior to the cutting and the tool face of the tool cutting lip, minus 90°.

By a cycloidal path—also called cyclic curve, cycloidal curve or rolling curve—may be understood as a path that describes a circle point on a directrix during unwinding of a circle. The directrix is configured for example as a concentric circle about the component rotating axis. In particular, the cycloidal path is configured as a prolonged cycloidal path, the tool cutting lip being arranged outside of the circle that unwinds on the directrix. Alternatively or additionally, the cycloidal path in form of a prolonged cycloidal path comprises loops at the peaks. The loops form the cutting path of the tool cutting lip in the component blank and thus define the geometric shape of the pocket sides.

Because of the manufacturing of the first pocket sides and an optional supplementation with the second pocket sides, in each case by cutting and not by scraping, and may be performed with a rake angle of the tool cutting lip between −15° and 0° or a positive rake angle, firstly the surface quality of the pocket sides of both the first and the second pocket sides is equally high and secondly the quality is high enough to permit an omission of a final machining or the final machining is already given through the first and the second cycloid machining step. In particular, the first and the second pocket sides are brought into final shape through the first and the second cycloid machining steps. This enables an economic manufacturing of the solid component with the cycloid machining method and at the same time makes it possible to achieve a high surface quality and/or shape stability that is to say a low tolerance.

To put it shortly, the actuation through the control device is divided into three steps, wherein in an optional preliminary step the rough pockets are made, in a first cycloid machining step the first pocket sides are cut and in a second cycloid machining step the second pocket sides are cut. It is also possible to realize the rough pockets by rough-turning and the first and second pocket sides by planing.

The disclosure further proposes that the chisel or its tool cutting lip particularly has a geometric configuration and/or such a configuration in a cross-sectional plane and/or in a radial plane relative to the tool rotating axis that a radial vector is formed relative to the tool rotating axis, which radial vector extends through the cutting edge of the tool cutting lip of the chisel, divides the tool cutting lip into a clearance angle section and a rake angle section, the clearance angle section being configured to be at least twice as large as the rake angle section.

Thus, mentally, the tool cutting lip, particularly as seen in an axial top view in direction of the tool rotating axis, can be divided into two angular regions, namely the clearance angle section and a rake angle section. These two sections are separated from each other by the radial vector. Due to the fact that the clearance angle section is chosen to be distinctly larger than the rake angle section, it is achieved that the solid component can be given its final shape by machining with the chisel. In particular, no further smoothening manufacturing steps or the like are needed any more.

In one embodiment of the disclosure, a wedge angle for the tool cutting lip of the chisel of between 53 degrees and 63 degrees has proved to be particularly advantageous. In one embodiment of the disclosure, the wedge angle is 58 degrees.

Alternatively or additionally, it may be preferred to configure the clearance angle section to be larger than 45 degrees. The geometric shape of the tool cutting lip is determined by an optional choice of the stated conditions.

According to one feature of the disclosure, the manufacturing device comprises a further chisel, wherein the chisel and the further chisel are arranged on the tool rotating device in opposite directions relative to each other. The chisel and the further chisel may be made with identical configurations at least with respect to the tool cutting lip while being arranged, however, with opposite orientations to each other on the tool rotating axis. According to the disclosure, the chisel machines one of the pocket sides and the further chisel machines the other pocket sides. In this way, it can be assured that each one of the pockets is machined to its final shape.

According to one embodiment of the disclosure, the manufacturing device comprises a preliminary machining chisel that has the function of machining the rough pockets into the component blank. From the geometric point of view, a further radial angle extends relative to the tool rotating axis and passes through the cutting edge of the tool cutting lip of the preliminary machining chisel outside of a wedge angle region of the tool cutting lip of the preliminary machining chisel. Through this geometric constellation it is assured that the preliminary machining chisel can machine both sides of the rough pockets into semi-finished product or the component blank. In this step, the quality of the surface of the machined rough pockets is not critical because these are still to be machined further in any case with the chisel and the further chisel.

According to one embodiment of the disclosure, a wedge angle of the tool cutting lip of the preliminary machining chisel is situated between 45 and 55 degrees. A wedge angle of 50 degrees has proved to be particularly advantageous.

A further subject matter of the disclosure concerns a method for manufacturing the solid component, wherein the method is implemented with a manufacturing device as described above or according to one of the preceding claims.

In the first cycloid machining step, it may be preferred to rotate the component blank in a component rotating direction and the tool cutting lip in a tool rotating direction. In the second cycloid machining step, in contrast, the component blank is rotated in an opposite component rotating direction and the tool cutting lip in an opposite tool rotating direction, that is to say each one is rotated in the opposite direction. Alternatively or additionally, it is advantageous for the first cycloid path to be configured oppositely oriented to the second cycloid path. In this way, identical or at least similar cutting conditions can be achieved for the first and the second pocket sides.

The first cycloid path and the second cycloid path may be arranged out-of-phase to each other but are configured particularly preferably identical in shape and/or in their extension layout. With this phase offset, in particular with an offset angle about the component rotating axis, it is achieved that in the first cycloid machining step only the first pocket side is manufactured, in particular cut, and the second pocket side remains free of contact, while in the second cycloid machining step only the second pocket side is manufactured, in particular cut, and the first pocket side remains free of contact.

It can be provided that the pocket sides are worked into the component blank radially from the outside or radially from the inside. In the first case, the tool cutting lip works from the outside towards the inside relative to the component rotating axis and in the second case, the tool cutting lip works from the inside towards the outside, likewise relative to the component rotating axis. The directions of rotation of the component blank and the tool cutting lip may be as follows: the tool cutting lip and the component blank rotate oppositely to each other or in opposite directions as long as the tool cutting lip is cutting starting from an outer periphery of the component blank. The tool cutting lip and the component blank rotate in one and the same direction as long as the component blank has an annular configuration and the tool cutting lip is cutting starting from an inner periphery of the component blank.

In one embodiment of the disclosure, the tool cutting lip and the further tool cutting lip comprise an angle of incidence relative to a radial vector to the cage rotating axis as a component rotating axis. The angles of incidence in the first cycloid machining step and in the second cycloid machining step may differ from each other. Through the different angles of incidence it is achieved that the respective tool cutting lip can be guided in both cycloid machining steps in a cutting modus, that is to say with the said rake angle. In one embodiment, the angles of incidence be of equal dimension relative to the radial vector while being arranged, however, mirror-symmetric to the radial vector. Changing the angle of incidence from the first to the second cycloid machining step can be achieved in different ways:

On the one hand it is possible to pivot the tool cutting lip in the transition from the first cycloid machining step to the second cycloid machining step through 180 degrees about the radial vector of the tool rotating axis in order to form the further tool cutting lip. Alternatively, it is also possible to use two different tool cutting lips that are arranged, for example, axially offset to each other along the tool rotating axis. It is also possible to utilize a tool exchanging system that exchanges the tool cutting lips between the cycloid machining steps.

In one embodiment of the disclosure, the feeding distance is varied depending on an axial position of the tool cutting lip relative to the cage blank. By varying the feeding distance, it becomes possible to configure the first and/or second pocket side not only parallel to the component rotating axis but also to give it another geometric shape. Particularly, the feeding distance may be depending on the axial position of the tool cutting lip relative to the component blank in such a way that the pockets have a trapezium-like shape. In particular, the pockets have a trapezium-like shape in a radial top view. The transition from rectangular pockets to trapezium-shaped pockets can thus be achieved in a simple manner by programming a corresponding manufacturing device and does not generate further costs in the manufacturing of the solid component. Alternatively or additionally, also the inclination and/or the inclination curve of the pocket sides in radial direction relative to the component rotating axis can vary from the first to the second pocket side. When viewing a front face of the pocket, i.e. in particular a bottom region or a cover region in axial direction, the limitations of the front sides in peripheral direction can be asymmetric to each other. In particular, the transitions to the pocket sides can be configured with a trapezium-like shape and/or configured independently from each other. In particular, each of the pockets has two front faces and two pocket sides, wherein at least one of the front faces viewed in direction of the component rotating axis has an approximately trapezium-like shape, in particular, a trapezium shape and/or the pocket sides viewed in a radial top view have an approximately trapezium-like shape in particular, a trapezium shape.

In one embodiment of the disclosure, the rough pockets are worked into the component blank in a preliminary cycloid machining step as a rough machining step. In the preliminary cycloid machining step, too, a tool cutting lip is guided relative to the component blank along a cycloid path, in this case a preliminary cycloid path. However, in the preliminary cycloid machining step it is proposed to manufacture both pocket sides of the rough webs in the same preliminary cycloid machining step. The background for this is that the pocket sides have to be brought into their final shape in any case by the subsequent cycloid machining steps so that no particularly high surface quality or manufacturing precision is required during the preliminary cycloid machining step. According to one feature of the disclosure, the first cycloid path is arranged out-of-phase to the preliminary cycloid path in a first peripheral direction and the second cycloid path is arranged out-of-phase to this in an opposite direction.

In one embodiment of the disclosure, the solid component is configured as a solid cage for a rolling bearing. The rolling bearing may be configured as a roller bearing, and, in one embodiment of the disclosure, as a taper roller bearing. The solid cage defines a cage rotating axis as a component rotating axis. The solid cage comprises a plurality of webs which form the intermediate regions, the pockets being arranged between the webs while being configured as receptions for rolling elements of the rolling bearing.

The solid cage can comprise exactly one circumferentially extending row of webs or may also be configured with two or three rows of webs. Optionally, the solid cage can comprise side rings or intermediate rings, wherein the webs connect the side rings and/or intermediate rings in axial direction. The side rings and/or intermediate rings and webs are all made together in one single piece.

In principle, it is possible for the pockets of the solid component to have a rectangular cross-section in a radial top view and/or, particularly in the embodiment as a solid cage, be configured to receive cylindrical rollers. However, the pockets may be configured with a trapezium shape and/or configured to receive tapered rollers.

Each web comprises a first and a second web side which at the same time form the pocket sides, wherein the web sides are configured to support the rolling bearings in peripheral direction about the cage rotating axis. In particular, the web sides comprise support surfaces for the rolling elements. All the first web sides are oriented in a first peripheral direction and all the second web sides are oriented in a second peripheral direction which is configured as an opposite direction to the first peripheral direction. The web sides define the webs in peripheral direction.

Alternatively or additionally, the rough pockets are disposed at that position in peripheral direction at which, after the further method steps the pockets for the reception of the rolling elements are arranged. In particular, each of the rough webs is configured wider than the webs in peripheral direction.

BRIEF DESCRIPTION OF THE DRAWINGS

Further features, advantages and effects of the disclosure will become obvious from the following description of a preferred example of embodiment of the disclosure as also from the appended figures. The figures show:

FIG. 1 an overall representation of the method of the disclosure showing different manufacturing steps of a solid cage;

FIG. 4a, b a schematic detail illustration of a preliminary cycloidal machining step in the region of a rough pocket;

FIG. 4c a detail illustration similar to FIGS. 4a, b for elucidating the characteristic geometrical values of the machining;

DETAILED DESCRIPTION

Figure 3:
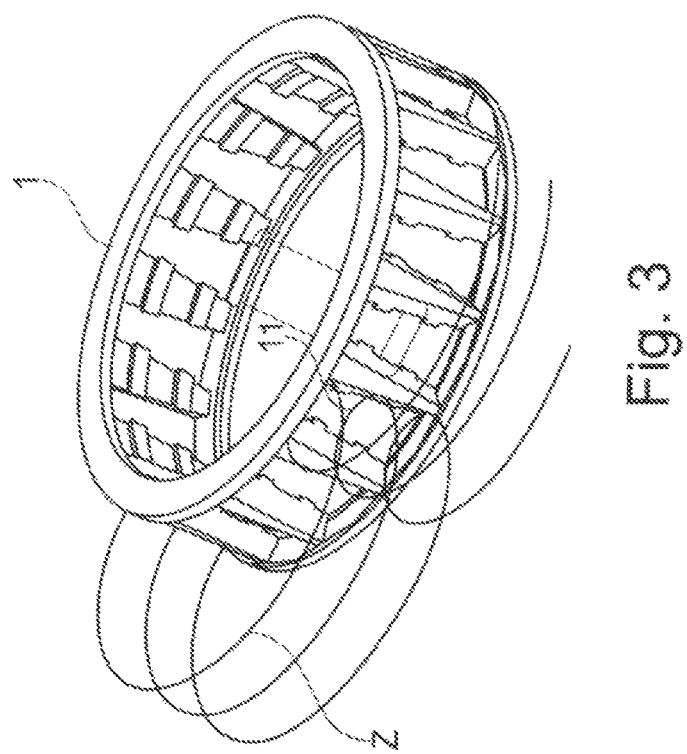
FIG. 3 a schematic three dimensional illustration of a solid cage with graphically shown cycloid path.

FIG. 1 shows a schematic overall representation of a method for manufacturing a solid cage 1 as a solid component like the one shown on the lower right-hand side in FIG. 1. The solid cage 1 is intended for installation in a rolling bearing and comprises a plurality of webs 2 as intermediate regions that are arranged uniformly distributed in peripheral region about a cage rotating axis K. Between the webs 2 is arranged respectively a pocket 3 for receiving a rolling element, in the present example, a roller. On axial end sides are arranged side rings 4, wherein the webs and/or the pockets 3 extend between the side rings 4. The solid cage 1 is made in one single piece.

Each of the webs 2 comprises a first web side 5a as a first pocket side and a second web side 5b as a second pocket side. In the example of embodiment shown in FIG. 1, the first web sides are oriented in clockwise direction and the second web sides are oriented in an anti-clockwise direction. For reasons of clarity, the reference numerals are shown by way of example only on two webs 2. In particular, all the first web sides 5a are oriented in one and the same direction and all the second web side 5b are oriented in one and the same opposite direction. During operation of the rolling bearing, not shown, the first and the second web sides 5a, b serve as run-on surfaces for the rolling elements, particularly the rollers. The first and the second web sides 5a and b are oriented particularly in a peripheral direction. As can further be seen in the illustration of the solid cage 1, this cage comprises snap lugs 6 that are formed integrally on the webs 2 on a radially inner side and serve during assembly of the rolling bearing to enable the rollers to snap into the pockets 3 and be retained there secure against loss.

The method for manufacturing the solid cage is realized by using a so-called cycloid machining, in which a tool cutting lip is guided in cycloid paths relative to the workpiece, in the present case, to the solid cage 1. For an elucidation of the cycloid machining, reference will be made to FIGS. 2 and 3.

Figure 2A:
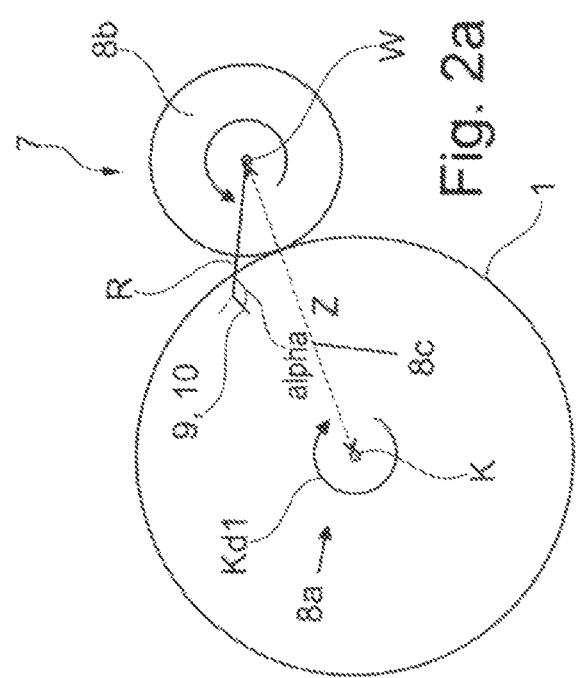
FIG. 2a, b in each case a schematic axial top view on a manufacturing device for manufacturing the solid cage, for elucidating the cycloid machining.

In FIG. 2a, a manufacturing device 7 is shown, strongly schematically, in an axial top view. The manufacturing device 7 is configured so as to rotate the solid cage 1 about the cage rotating axis K in a first cage rotating direction KD1 using a component rotating device 8a. The manufacturing device 7 further comprises a tool rotating device 8b, for example a spindle drive, the tool rotating device 8b defining a tool rotating axis W. The cage rotating axis K and the tool rotating axis W extend parallel to each other but offset from each other by a feeding distance Z. A feeding device 8c enables a variation of the feeding distance.

The tool rotating device 8b rotates a tool cutting lip 9 of a chisel 10 in a tool rotating direction WD1, wherein the tool cutting lip 9 is spaced from the tool rotating axis W by a radial vector R and placed at an angle of incidence a relative to the radial vector R. Through a simultaneous rotation of the solid cage 1 about the cage rotating axis K and the tool cutting lip 9 about the tool rotating axis W, the tool cutting lip 9 describes a cycloid path relative to the solid cage 1 identified at Z in FIG. 3. Through an appropriate rotation of the solid cage 1 and the tool cutting lip 9 the cycloid path Z is configured such that loops 11 of the cycloid path Z are arranged in the pockets 3. Thus, the pockets 3 can be made in the solid cage 1 by guiding the tool cutting lip 9 along the cycloid path Z.

Figure 2B:
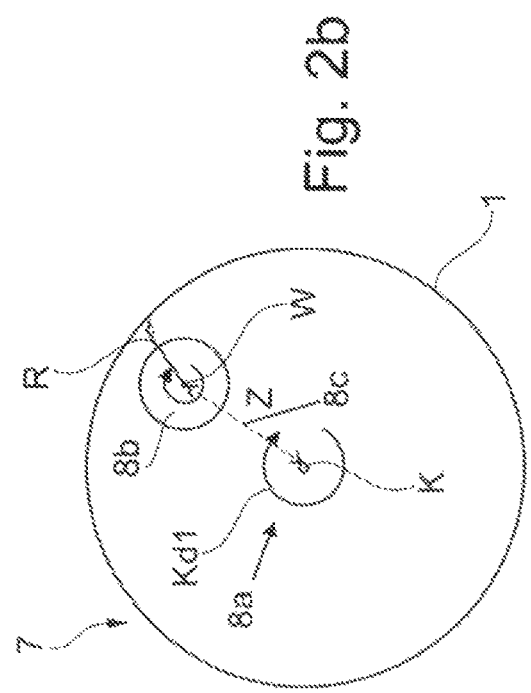

FIG. 2a shows a form of embodiment of the manufacturing device 7 in which the tool rotating axis W is arranged outside of the solid component, in the present example of embodiment, outside of the solid cage 1 so that the tool cutting lip 9 is fed to the solid component radially from the outside. FIG. 2b, in contrast, shows a form of embodiment of the manufacturing device 7 in which the tool rotating axis W is arranged within the solid component, so that the tool cutting lip 9 is fed to the solid component radially from the inside.

However, the pockets 3 are not made by the cycloid machining in one single manufacturing step. Much rather, manufacturing of the pockets is achieved in three individual steps as explained in the following with reference to FIG. 1.

In the upper central part of FIG. 1 is shown a cage blank 12 which already comprises rough webs 13 in the positions of the later webs 2, as also rough pockets 14. In principle, the rough pockets 14 can be made by any desired method but, from the manufacturing point of view, it is particularly simple to make them with a preliminary cycloid machining step used as a rough machining step.

The preliminary cycloid machining step will be elucidated with reference to FIGS. 4*a, b, c*. The FIGS. 4*a, b, c* show, each one, a detail section of the cage blank 12, wherein the rough webs 13 and the rough pockets 14 can already be discerned. The tool cutting lip 9 is guided along a preliminary cycloid path (FIG. 4*c*). Along this path are made through a cutting step those sides of the rough webs 13 that correspond to the later first web sides 5*a*. In contrast, as can be seen in FIG. 4*b*, those sides of the rough webs 13 which correspond later to the web sides 5*b* are made by scraping. In other words, the rake angle of the tool cutting lip 9 in FIG. 4*a* is a positive angle and can become a negative angle in FIG. 5*b*. In FIG. 4*c*, the rake angle in the preliminary cycloid machining step on the second web side 5*b* of FIG. 4*c* is graphically shown as −5 degrees.

Thus, through the preliminary cycloid machining step, through-holes in the form of rough pockets 14 are made in the cage blank 12. However, the surface quality, particularly of that web side that corresponds later to the second web side 5*b* and is machined by scraping, and/or with a negative rake angle, does not meet the exactness requirements made for the solid cage 1. For this reason, the final machining of the first and the second web side 5*a, b* is performed with a first and a second cycloid machining step.

The result of the first cycloid machining step is shown on the lower left-hand side in FIG. 1, wherein the first web sides 5*a* receive their final machining in the first cycloid machining step. In the course of the first cycloid machining step the tool cutting lip 9 of the chisel 10 or a further tool cutting lip 9 of a further chisel 10 is guided along a first cycloid path. However, the first cycloid path is arranged offset relative to the preliminary cycloid path of the preliminary cycloid machining step in peripheral direction about the cage rotating axis K.

Figure 5A:
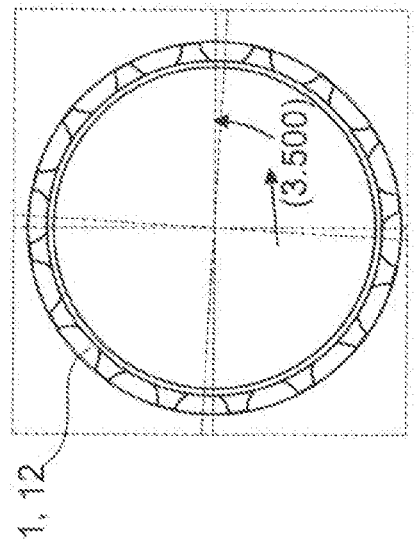
FIG. 5a, b a schematic illustration of the manufacturing of the first web sides of the solid cage.

FIGS. 5*a, b* and *c* show the first cycloid machining step. In FIG. 5*a* it can be seen that the solid cage 1, or the cage in form of the cage blank 12, is offset in this example at an angle of 3.5 degrees about the cage rotating axis K. This results in an out-of-phase state of the first cycloid path relative to the preliminary cycloid path by the said dimension of 3.5 degrees. In particular, the minima and/or the maxima of the first cycloid path and the preliminary cycloid path are offset to one another by the phase offset about the cage rotating axis K.

Figure 5C:
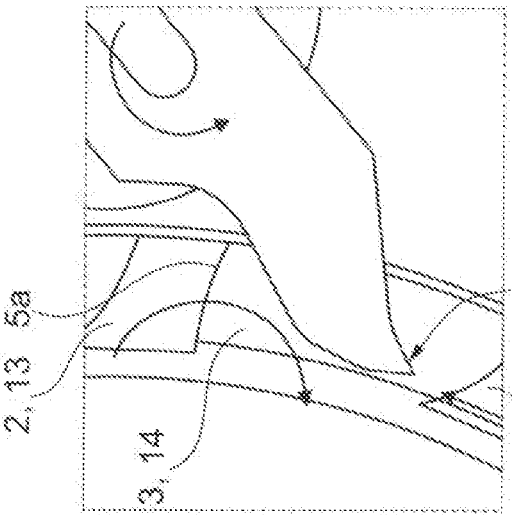
FIG. 5c a schematic illustration of a phase offset of a first cycloid path.
Figure 5B:
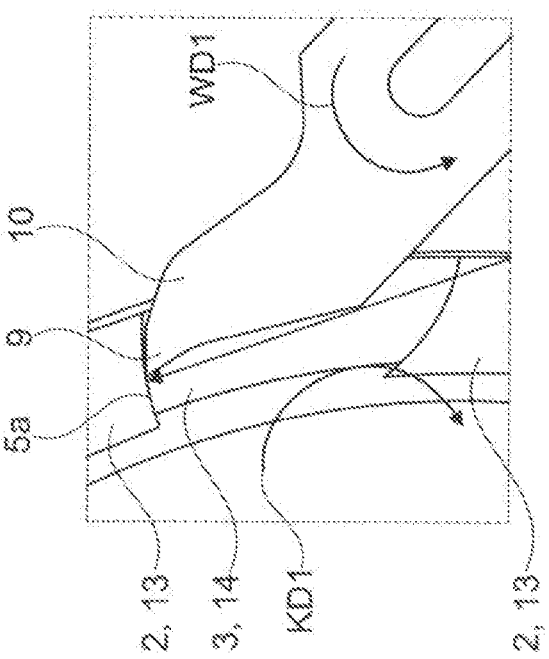

FIG. 5*b* shows the tool cutting lip 9 in a plunged-in position, wherein it can be discerned that the tool cutting lip 9 is guided along the first cycloid path such that the tool cutting lip 9 cuts the first web sides 5*a* and/or machines with a positive rake angle. FIG. 5*c* shows the exit of the tool cutting lip 9 from the pocket 3, and it can be seen that the tool cutting lip 9 is guided at a distance or without contact to the side of the rough webs 13 which will later form the second web sides 5*b*. Thus, in the first cycloid machining step only the first web sides 5*a* are manufactured. The cage rotating direction KD1 of the solid cage or of the cage blank 12 and the tool rotating direction WD1 of the tool cutting lip 9 about the tool rotating axis W are opposed to each other.

Figure 6A:
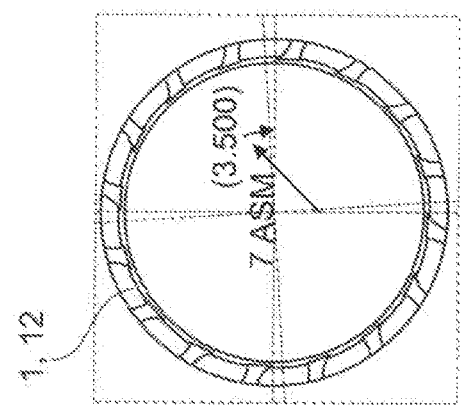
FIG. 6a, b a schematic illustration of the manufacturing of the second web sides.
Figure 6C:
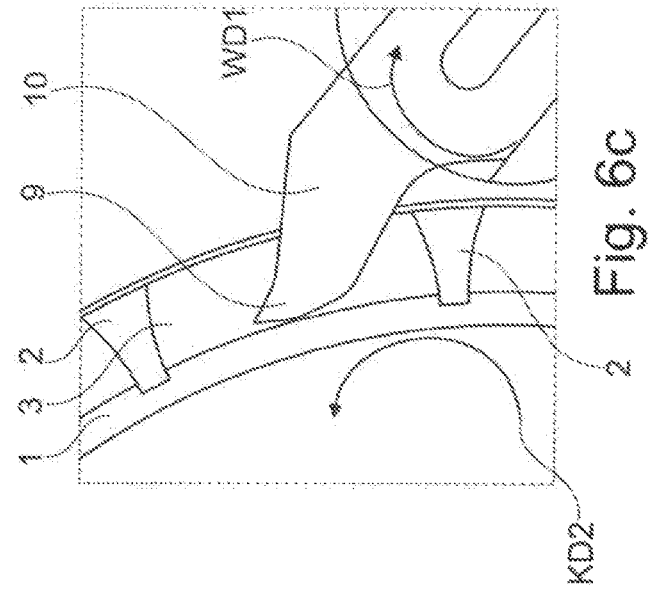
FIG. 6c a schematic illustration of a phase offset of the second cycloid path.
Figure 6B:
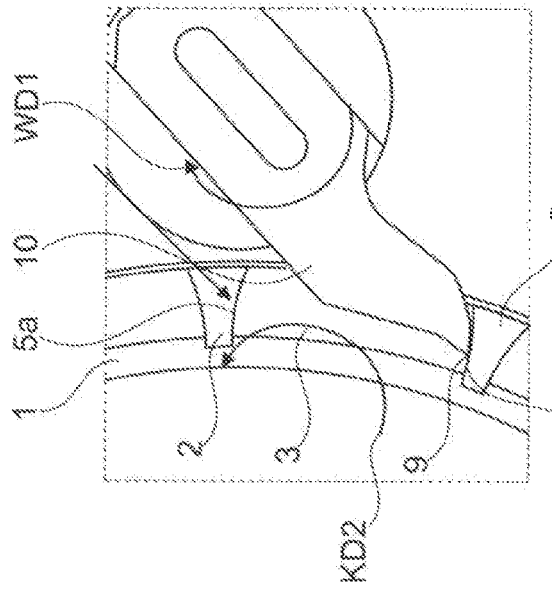

After the first cycloid machining step has been carried out and, in particular, when the first web sides 5*a* have been given final machining, a second cycloid machining step follows. As shown in FIGS. 6*a, b, c*, the angle of incidence alpha of the tool cutting lip 9 is changed for the second cycloid machining step. In particular, the chisel 10 is turned around through 180°. In addition, the second cycloid path is like offset in phase to the preliminary cycloid path, in the present case, however, by 3.5° in an opposite direction.

Moreover, the directions of rotation of the solid cage 1, or the cage blank 12, and the tool cutting lip 9 about the tool rotating axis W are reversed so that the solid cage 1, or the cage blank 12, is rotated in an opposite cage rotating direction KD2 and the tool cutting lip is rotated in an opposite tool rotating direction WD2. The result is that the tool cutting lip 9 is guided such that, in the second cycloid machining step, the second web sides 5*b* are cut and/or the rake angle of the tool cutting lip 9 is positive. During exit, the tool cutting lip 9 is again free of contact with the first web sides 5*a*. The first and the second cycloid paths have the same shape but extend in opposed directions and are offset to each other on the whole by twice the phase offset, i.e. in the present case, the offset to each other is 7°.

Thus, both the first web sides 5*a* as also the second web sides 5*b* are cut or machined with a positive rake angle of the tool cutting lip 9 so that they have a high surface quality which can be considered as a final machining.

Incidentally, the snap lugs 6 are also manufactured in the first and second cycloid machining step.

In principle, it is possible to configure a solid cage 1 with pockets 3 which pockets 3, as seen in a radial top view from the outside, have a rectangular configuration. This is shown in FIG. 1. However, depending on an axial position of the tool cutting lip 9, it is also possible to vary the feeding distance Z during the machining such that trapezium-shaped pockets 3, as shown in FIG. 3, are formed. The transition from rectangular pockets 3 to trapezium-shaped pockets 3 can be realized by adjusting the programming of the manufacturing device 6.

Figure 7:
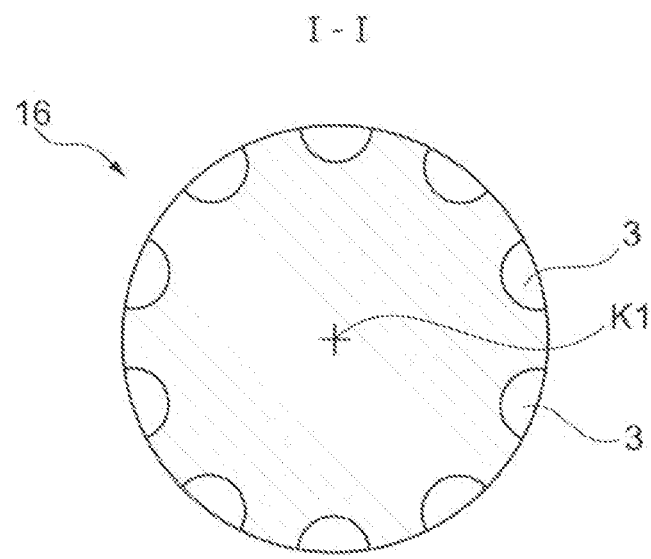
FIG. 7 a schematic cross-sectional illustration of a solid shaft, as a further example of embodiment of the disclosure.
Figure 8:
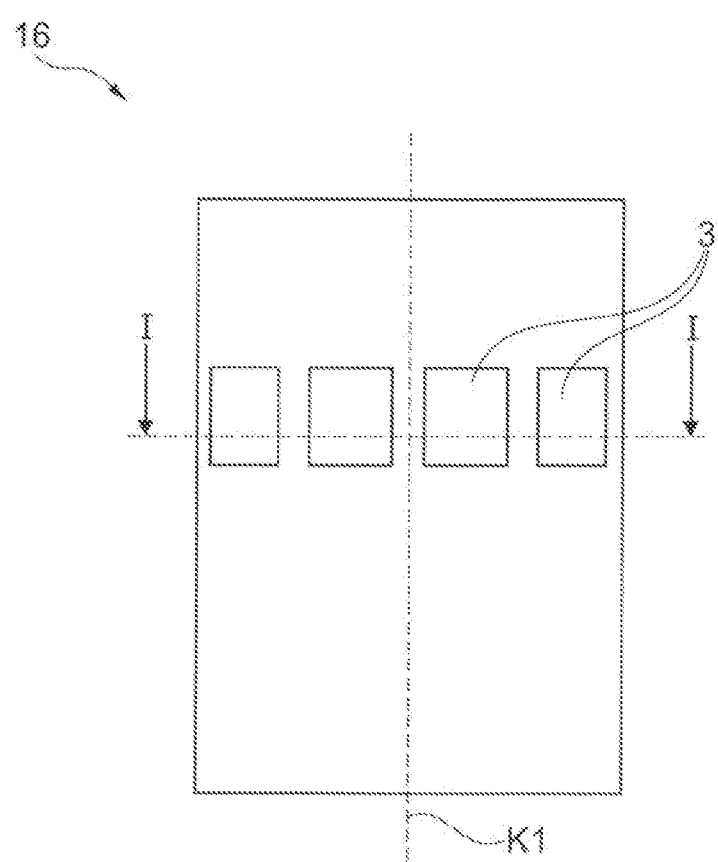
FIG. 8 the solid shaft of FIG. 7 in a radial top view.

In FIGS. 7 and 8, as a further example of embodiment of the disclosure, a solid component configured as a solid shaft 16 is shown in a cross-sectional representation and in a radial top view. The solid shaft 16 comprises a plurality of pockets 3 that are made in this example of embodiment in form of blind pockets and not, as to be seen in the preceding figures, as pass-through pockets. The pockets 3 can be made as described above in the case of the solid cage 1 with the sequence of method steps of the preliminary cycloid machining step and the cycloid machining steps.

Figure 9:
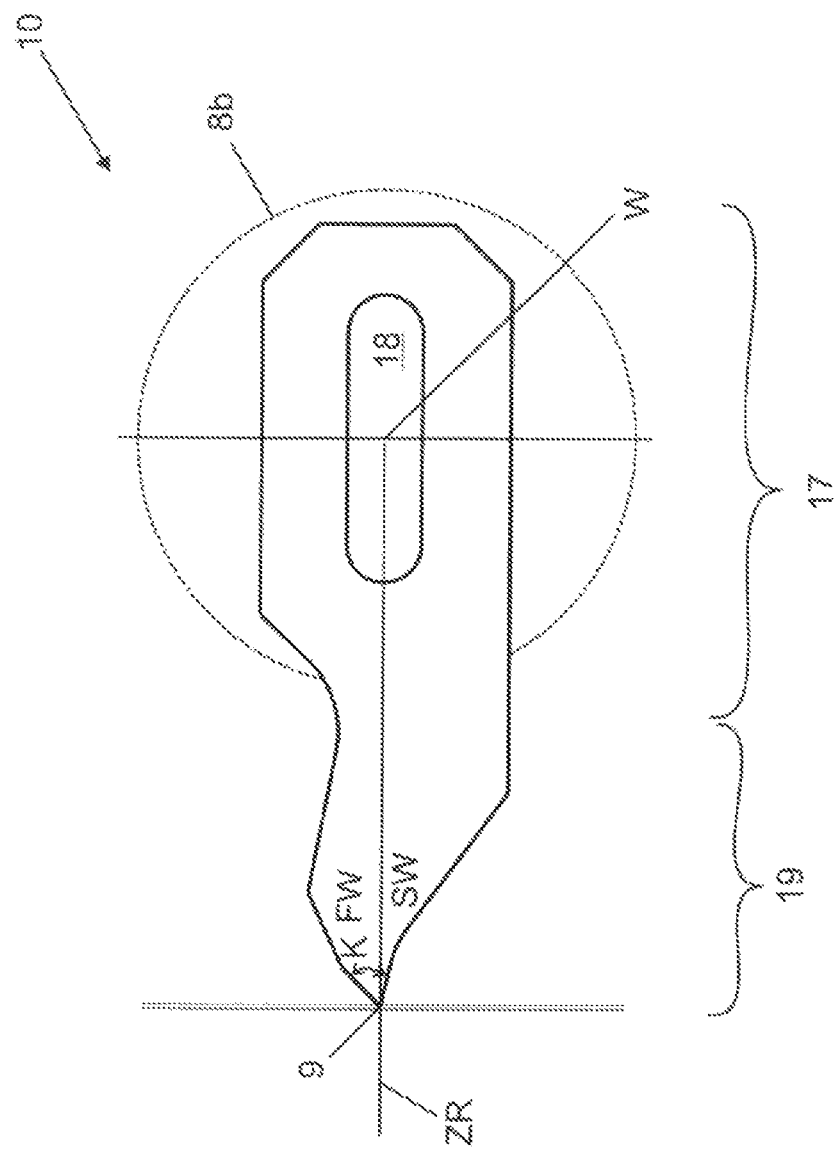
FIG. 9 a schematic top view of a chisel for the cycloid path machining step.

FIG. 9 shows the chisel 10 as used in the cycloid machining step in an axial plan view from above. The chisel 10 is arranged on the tool rotating device 8*b* and rotated about the tool rotating axis W. The chisel 10 comprises a reception section 17 in which an oblong hole 18 is made as an interface to the tool rotating device 8*b*. In the top view, the reception section 17 has a rectangular basic contour.

Adjacent to the reception section 17 is arranged a chisel section 19 on whose free end turned away from the reception section 17 is arranged the tool cutting lip 9. The tool cutting lip 9 extends parallel to the tool rotating axis W. The tool cutting lip 9 or the chisel 10 comprises a wedge angle K which in the present example of embodiment has a dimension of 58°.

In FIG. 9 is graphically shown a radial vector ZR which extends from the tool rotating axis W through the tool cutting lip 9 and, as a radial vector, extends vertically on the tool rotating axis W. The radial vector ZR passes through the angular region defined by the wedge angle K and divides this into a clearance angle section FW and a rake angle section SW. The clearance angle section FW extends from the radial vector ZR to the border of the wedge angle K. The rake angle section SW extends in an opposite direction from the radial vector ZR up to other border of the wedge angle K. The clearance angle section FW is configured clearly larger than the rake angle section SW and, in the present example of embodiment, has a dimension of 48°. The rake angle section SW, in contrast, has a dimension of only 13°. Through this cutting lip geometry, the cycloid machining step can be executed with the necessary precision. In order to achieve an adequate stability of the chisel 10, this is configured with a crank shape.

Figure 10:
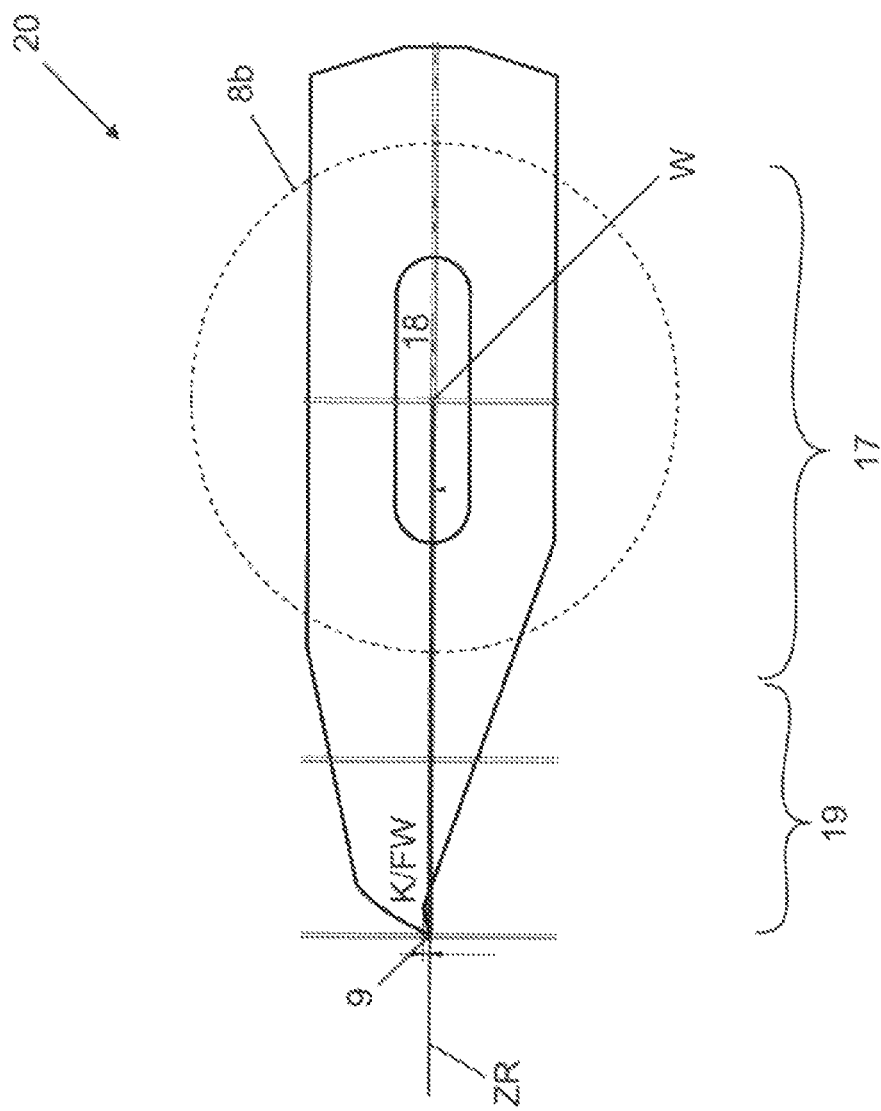
FIG. 10 a schematic top view of a preliminary machining chisel for a preliminary cycloid machining step.

FIG. 10 shows a preliminary machining chisel 20 which, similar to the chisel 10 shown in FIG. 9, can be divided into a reception section 17 and a chisel section 19. A radial vector ZR is likewise defined and extends from the tool rotating axis W through the tool cutting lip 9. However, the wedge angle K of the preliminary machining chisel 20 has a dimension of 50°. Further, the region of the wedge angle K extends exclusively in the clearance angle region FW, wherein the clearance angle region FW is arranged opposed to the rotating direction of the preliminary machining chisel 20 in front of the radial vector ZR. In particular, in the top view shown, it can be seen that a recessed region is created that is defined by the border of the wedge angle K and/or of the clearance angle region FW on the one side and the radial vector ZR on the other side.

LIST OF REFERENCE NUMERALS

1 Solid cage
2 Webs
3 Pockets
4 Side rings
5a First web sides
5b Second web sides
6 Snap lugs
7 Manufacturing device
8a Component rotating device
8b Tool rotating device
8c Feed direction
9 Tool cutting lip
10 Chisel
11 Loops
12 Cage blank
13 Rough webs
14 Rough pockets
15 Preliminary cycloid path
16 Solid shaft
17 Reception section
18 Oblong hole
19 Chisel section
20 Preliminary machining chisel
α Angle of incidence
K1 Cage rotating axis
Radial vector
KD1 Cage rotating direction
KD2 Opposite cage rotating direction
W Tool rotating axis
WD1 Tool rotating direction
WD2 Opposite tool rotating direction
Z Feeding distance
ZR Radial vector of chisel 10 and of preliminary machining chisel 20
K Wedge angle
FW Clearance angle section
SW Rake angle section

The invention claimed is:

1. A manufacturing device for manufacturing a solid component out of a component blank, comprising:
a component rotating device for rotating the solid component about a component rotating axis;
a first chisel configured to machine the component blank when rotated in a first direction, wherein the first chisel comprises a tool cutting lip that faces the first direction;
a tool rotating device for rotating the first chisel about a tool rotating axis, wherein the tool rotating axis is arranged offset to the component rotating axis;
a feeding device for varying feeding distance between the component rotating axis and the tool rotating axis;
a control device for controlling the component rotating device, the tool rotating device and the feeding device, the control device configured so that, for machining a plurality of rough pockets of the component blank, the tool cutting lip of the first chisel is guided along a cycloid path relative to the component blank while the component blank is rotating about the component rotating axis in one component rotating direction, wherein a radial vector to the tool rotating axis that extends through a cutting edge of the tool cutting lip of the first chisel divides the tool cutting lip into a clearance angle section and a rake angle section, wherein the clearance angle section is configured to be at least twice as large as the rake angle section that includes a rake angle defined by at least a material plane prior to the cutting and a tool face of the tool cutting lip and minus 90 degrees, wherein the clearance angle section and the rake angle section are two angular regions separated from each other by the radial vector;
wherein the tool cutting lip includes a wedge angle defined by where the radial vector passes through an angular region of the tool cutting lip defined by the wedge angle that includes both the rake angle and clearance angle, wherein the clearance angle section extends from the radial vector to a first boundary of the wedge angle; and the rake angle section extends in the opposite direction from the radial vector to a second boundary of the wedge angle, wherein the wedge angle is between 53° and 63° and the clearance angle section is configured to be larger than 45°; and
a second chisel configured to machine the component blank when rotated in a second direction that is opposite the first, wherein the second chisel comprises a tool cutting lip that faces the second direction.

2. The manufacturing device of claim 1, wherein the manufacturing device further includes a preliminary machining chisel, wherein a further radial vector to the tool rotating axis that extends through the cutting edge of the tool cutting lip of the preliminary machining chisel extends outside of the wedge angle region of the tool cutting lip of the preliminary machining chisel.

3. The manufacturing device of claim 2, wherein the manufacturing device includes the wedge angle of the tool cutting lip of the preliminary machining chisel has a value of between 45° and 55°.

4. The manufacturing device of claim 1, wherein the first chisel and the second chisel are axially offset along the tool rotating axis.

5. A manufacturing device, comprising:
a component rotating device for rotating a component blank about an axis of rotation of the component;
a first chisel that includes a tool cutting lip configured to cut off material from the component blank including a plurality of rough pockets;
a tool rotating device configured to rotate the chisel about a tool rotating axis that is arranged offset to the axis of rotation of the component;
a feeding device configured to vary a feeding distance defined between the axis of rotation of the component and the tool rotating axis;
a control device for controlling the component rotating device, the tool rotating device, and the feeding device, wherein the tool cutting lip of the first chisel is configured to guide along a cycloid path relative to the component blank while the component blank is rotating about the component rotating axis in one component rotating direction when machining the plurality of rough pockets of the component blank;
a radial vector of the tool rotating axis that extends through a cutting edge of the tool cutting lip of the first chisel and divides the tool cutting lip into a clearance angle section and a rake angle section, wherein the clearance angle section is configured to be at least twice as large as the rake angle section, wherein the tool cutting lip includes a wedge angle is defined by where the radial vector passes through an angular region defined by the wedge angle that includes both the rake angle and the clearance angle, wherein the clearance angle section extends from the radial vector to a first boundary of the wedge angle; and the rake angle section extends in the opposite direction from the radial vector to a second boundary of the wedge angle; and
a second chisel, wherein the first chisel and the second chisel are arranged on the tool rotating device in opposite directions to each other and wherein the first chisel and the second chisel are axially offset along the tool rotating axis.

6. The manufacturing device of claim 5, wherein the first chisel is configured to machine the component blank when rotated in a first direction, and the second chisel is configured to machine the component blank when rotated in a second direction that is opposite the first.

7. The manufacturing device of claim 6, wherein the tool cutting lip of the first chisel faces the first direction and a tooling cutting lip of the second chisel faces the second direction.

8. The manufacturing device of claim 5, wherein the tool rotating axis and the component rotating axis are parallel to each other.

9. The manufacturing device of claim 5, wherein the control device is configured to drive the manufacturing device so that the tool cutting lip of the first chisel is guided relative to the component blank.

10. The manufacturing device of claim 5, wherein the clearance angle section is configured to be larger than 45°.

11. The manufacturing device of claim 5, wherein the wedge angle is between 53° and 63°.

12. The manufacturing device of claim 5, wherein the first chisel and second chisel include identical configurations of the tool cutting lip while being arranged with opposite orientations to each other on the tool rotating axis.

13. The manufacturing device of claim 5, wherein the manufacturing device is configured to vary an axial position of the tool cutting lip, the component blank, a semi-finished product, or a solid component.

14. The manufacturing device of claim 5, wherein the manufacturing device further includes a preliminary machining chisel, wherein a further radial vector to the tool rotating axis that extends through a cutting edge of the tool cutting lip of the preliminary machining chisel and extends outside of a wedge angle region of the tool cutting lip of the preliminary machining chisel.

15. A method of manufacturing, comprising:
utilizing at least one cycloid machine to machine a component blank, wherein the component blank includes a plurality of pockets;
guiding a first tool cutting lip of a first chisel along a cycloid path relative to the component blank rotating about a component rotation axis;
rotating the first chisel in a first direction about a first tool rotating axis, wherein the tool rotating axis is arranged offset to the component rotating axis;
machining a first side of the plurality of pockets with the first tool cutting lip, wherein a radial vector to a tool rotation axis that extends through a cutting edge of the first tool cutting lip;
dividing the first tool cutting lip into a clearance angle portion and into a rake angle portion, wherein the clearance angle portion is configured to be at least twice as large as the rake angle portion of the first chisel, and wherein the first tool cutting lip includes a wedge angle that is defined by where the radial vector passes through an angular region defined by the wedge angle that includes both the rake angle and the clearance angle, wherein the clearance angle portion extends from the radial vector to a first boundary of the wedge angle, and the rake angle portion extends in the opposite direction from the radial vector to a second boundary of the wedge angle;
guiding a second tool cutting lip of a second chisel along a cycloid path relative to the component blank rotating about the component rotation axis;
rotating the second chisel in a second direction that is opposite the first direction about the tool rotating axis; and
machining a second side of the plurality of pockets with the second tool cutting lip.

16. The method of claim 15 further comprising:
dividing the second tool cutting lip into a clearance angle portion and into a rake angle portion, wherein the clearance angle portion is configured to be at least twice as large as the rake angle portion of the second chisel, and wherein the second tool cutting lip includes a wedge angle that is defined by where the radial vector passes through an angular region defined by the wedge angle that includes both the rake angle and the clearance angle, wherein the clearance angle portion extends from the radial vector to a first boundary of the wedge angle, and the rake angle portion extends in the opposite direction from the radial vector to a second boundary of the wedge angle.

* * * * *